United States Patent
Almalki

(10) Patent No.: US 8,041,403 B2
(45) Date of Patent: Oct. 18, 2011

(54) MOBILE CELLULAR DEVICE PROVIDING HYBRID DYNAMIC/STATIC RECEIVED SIGNAL MEASUREMENT SCHEDULING CONTROL AND RELATED METHODS

(75) Inventor: Nazih Almalki, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 977 days.

(21) Appl. No.: 11/955,600

(22) Filed: Dec. 13, 2007

(65) Prior Publication Data
US 2009/0036172 A1     Feb. 5, 2009

Related U.S. Application Data

(60) Provisional application No. 60/952,610, filed on Jul. 30, 2007.

(51) Int. Cl.
| H04M 1/00 | (2006.01) |
| H04B 1/38 | (2006.01) |
| H04B 7/00 | (2006.01) |
| H04B 7/185 | (2006.01) |
| G08C 17/00 | (2006.01) |
| H04W 4/00 | (2009.01) |
| H04J 3/16 | (2006.01) |

(52) U.S. Cl. ........ 455/574; 455/515; 370/311; 370/318; 370/332; 370/338; 370/468

(58) Field of Classification Search ............... 455/515, 455/574; 370/311, 318, 332, 338, 468
See application file for complete search history.

(56) References Cited

U.S. PATENT DOCUMENTS

| 6,002,918 | A | 12/1999 | Heiman et al. | 455/38.3 |
| 6,073,030 | A | 6/2000 | Nair et al. | 455/557 |
| 6,131,015 | A | 10/2000 | Hill et al. | 455/69 |
| 7,136,680 | B2* | 11/2006 | Leizerovich et al. | 455/574 |
| 2002/0089952 | A1* | 7/2002 | Cao et al. | 370/335 |
| 2004/0229659 | A1* | 11/2004 | Boos et al. | 455/574 |
| 2005/0085190 | A1* | 4/2005 | Nishikawa | 455/63.1 |
| 2006/0205406 | A1 | 9/2006 | Pekonen et al. | 455/436 |

FOREIGN PATENT DOCUMENTS
| EP | 1503545 | 2/2005 |
| WO | WO2007050729 | 5/2007 |

* cited by examiner

*Primary Examiner* — Marisol Figueroa
(74) *Attorney, Agent, or Firm* — Allen, Dyer, Doppelt, Milbrath & Gilchrist, P.A.

(57) ABSTRACT

A cellular communications system may include a cellular base station and at least one mobile cellular device communicating with the cellular base station. The at least one mobile cellular device may include a receiver and a processor cooperating with the receiver for implementing a hybrid dynamic and static received signal measurement scheduling control. The processor may include a dynamic scheduler for scheduling recurring received signal measurement times, a static schedule memory for storing common data for received signal measurements, and a micro-scheduler for scheduling received signal measurements based upon the recurring received signal measurement times and the common data for received signal measurements.

24 Claims, 4 Drawing Sheets

MOBILE CELLULAR DEVICE PROVIDING HYBRID DYNAMIC/STATIC RECEIVED SIGNAL MEASUREMENT SCHEDULING CONTROL AND RELATED METHODS

RELATED APPLICATION

This application is based upon prior filed copending provisional application Ser. No. 60/952,610 filed Jul. 30, 2007, the entire subject matter of which is incorporated herein by reference in its entirety.

FIELD OF THE INVENTION

The present invention relates to the field of communications systems, and, more particularly, to cellular communications systems, devices, and related methods.

BACKGROUND OF THE INVENTION

Cellular communications systems continue to grow in popularity and have become an integral part of both personal and business communications. Cellular phones allow users to place and receive voice calls most anywhere they travel. Moreover, as cellular telephone technology has increased, so too has the functionality of cellular devices. For example, many cellular devices now incorporate personal digital assistant (PDA) features such as calendars, address books, task lists, etc. Moreover, such multi-function devices may also allow users to wirelessly access electronic mail (email) messages and the Internet via a cellular network.

With all of the functionality that a user can perform with such devices, calls made by users, and the overhead operations required of the device, battery life may be a significant concern for cellular phone manufacturers. For example, the Global System for Mobile communication (GSM)/Enhanced Data rates for Global Evolution (EDGE) and Universal Mobile Telecommunications System (UTMS) (i.e., 3G) systems require handsets to perform measurements of Receive Signal Strength Indication (RSSI) of neighboring base station on a periodic basis (e.g., every 30 seconds). These operations are even required when a device is in a "sleep" or power saving mode.

Various approaches have been implemented for attempting to reduce power consumption in mobile cellular devices. For example, U.S. Pat. No. 6,002,918 to Heiman et al. discloses a communications network including a cellular local area wireless network which includes a plurality of access points connected to a housed computer and each other, and a plurality of mobile units. Each mobile unit is arranged for association with an access point. The mobile units are also arranged to periodically scan for and identify the most eligible access point for association on the basis of the criteria of best quality signal strength and loading factor. To identify when mobile units are being removed from a predetermined area, access points having directional antennae are situated adjacent exit points to detect when mobile units are in a vicinity. Each mobile unit may include paging facilities, including the capability of transmitting information in a coded form known both to the unit and to a host, and power-saving facilities.

Despite the existence of such systems, further approaches and techniques for mitigating the power consumption of handheld device operations may be desirable to extend mobile device battery life.

DETAILED DESCRIPTION OF THE PREFERRED EMBODIMENTS

The present description is made with reference to the accompanying drawings, in which preferred embodiments are shown. However, many different embodiments may be used, and thus the description should not be construed as limited to the embodiments set forth herein. Rather, these embodiments are provided so that this disclosure will be thorough and complete. Like numbers refer to like elements throughout.

Generally speaking, a cellular communications system is disclosed herein which may include a cellular base station and at least one mobile cellular device communicating with the cellular base station. More particularly, the at least one mobile cellular device may include a receiver and a processor cooperating with the receiver for implementing a hybrid dynamic and static received signal measurement scheduling control. The processor may include a dynamic scheduler for scheduling recurring received signal measurement times, a static schedule memory for storing common data for received signal measurements, and a micro-scheduler for scheduling received signal measurements based upon the recurring received signal measurement times and the common data for received signal measurements.

By way of example, the received signal measurements may be Received Signal Strength Indicator (RSSI) measurements. Additionally, the processor may operate in accordance with a hierarchical protocol layer architecture, and the dynamic scheduler may operate at a higher protocol layer than the micro-scheduler. The micro-scheduler may operate at a data link layer, for example.

The at least one mobile cellular device may further include a transmitter, and the processor may further include an event generator cooperating with the transmitter, receiver and micro-scheduler to perform the received signal measurements. Moreover, the event generator may operate at the physical layer. Additionally, the micro-scheduler may provide the common data to the event generator using Direct Memory Access (DMA), for example. The at least one mobile cellular communication device may also include at least one antenna coupled to the receiver.

A mobile cellular communications device, such as the one described briefly above, and a hybrid dynamic and static received signal measurement scheduling control method for a mobile cellular device are also provided. The method may include dynamically scheduling recurring received signal measurement times, storing common data for received signal measurements in a static schedule memory, and scheduling received signal measurements based upon the recurring received signal measurement times and the common data for received signal measurements.

Figure 1:
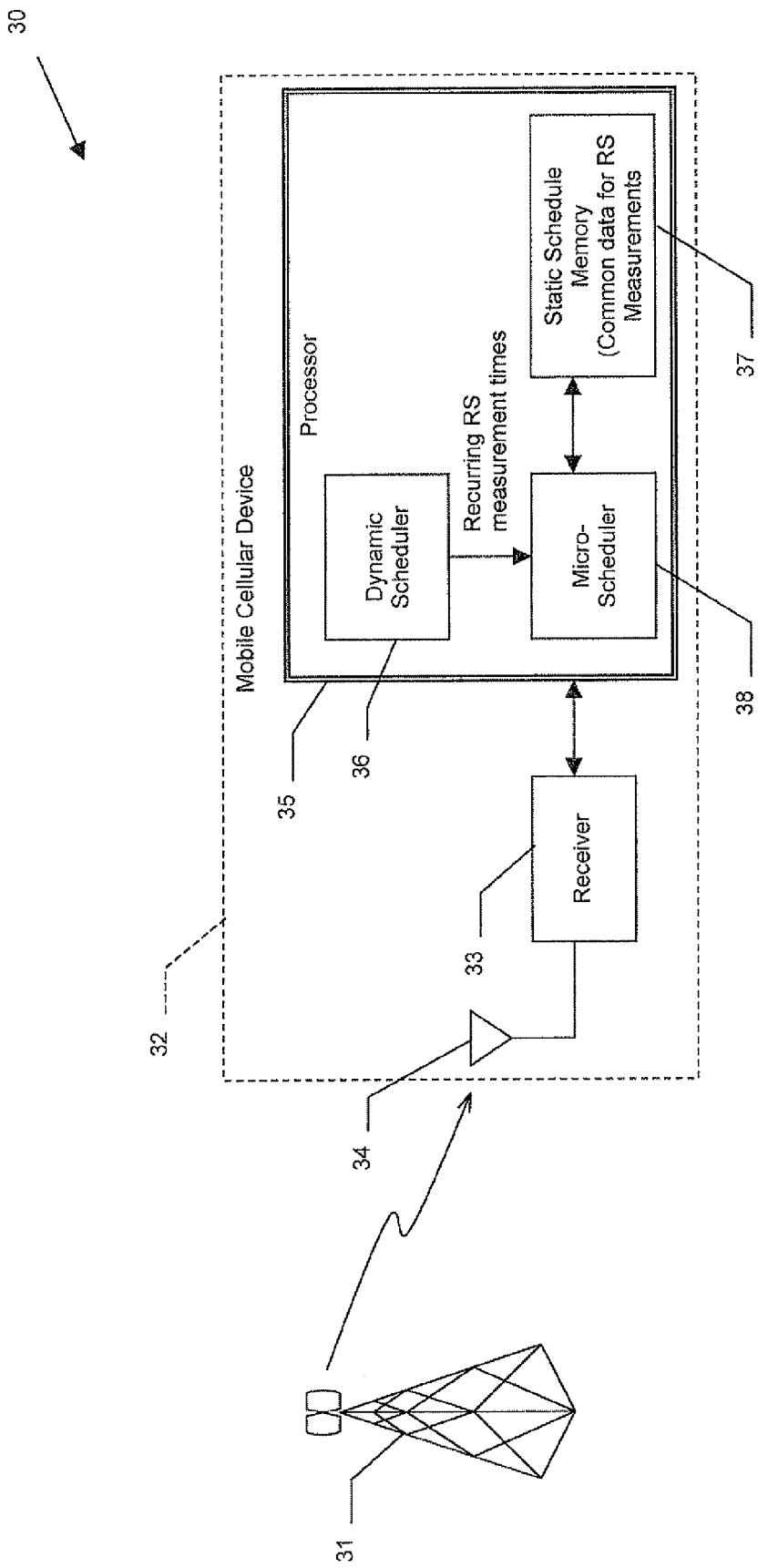
FIG. 1 is a schematic block diagram of a cellular communications system in accordance with one aspect.
Figure 2:
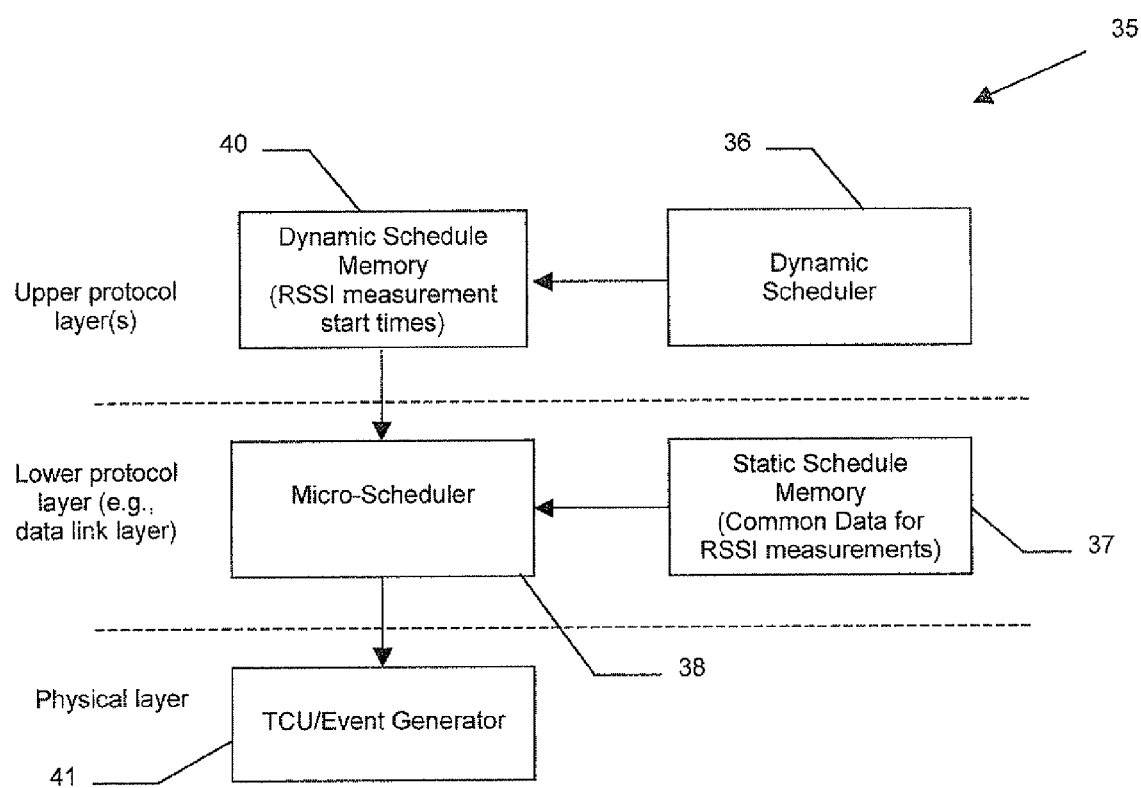
FIG. 2 is a schematic block diagram of the mobile cellular device processor of FIG. 1 in accordance with one exemplary embodiment.

Referring initially to FIGS. 1 and 2, a cellular communications system 30 illustratively includes a cellular base station 31 and one or more mobile cellular devices 32 communicating with the cellular base station. The mobile cellular device 32 illustratively includes a receiver 33 and associated antenna 34, and a processor 35 cooperating with the receiver for implementing a hybrid dynamic and static received signal measurement scheduling control, as will be discussed further below. The processor 35 further illustratively includes a dynamic scheduler 36 for scheduling recurring received signal measurement times, such as Receive Signal Strength Indication (RSSI) measurements, a static schedule memory 37 for storing common data for received signal measurements, and a micro-scheduler 38 for scheduling received signal measurements based upon the recurring received signal measurement times and the common data for received signal measurements.

The micro-scheduler 38 may advantageously schedule and keep track of when certain cellular network operations are to be performed, such as the above-described RSSI measurements. The micro-scheduler preferably 38 operates at a lower protocol layer of a hierarchical protocol layer architecture (e.g., OSI protocol) than the dynamic scheduler 36, such as the data link layer, and retrieves schedule information from the dynamic scheduler via a dynamic schedule memory 40. The dynamic scheduler 36 operates in an upper protocol layer(s), such as an application layer, for example. Thus, in the present example, the dynamic scheduler 36 generates the recurring RSSI measurement start times, although other received signal recurring scheduling information may also be generated by the dynamic scheduler, as will be appreciated by those skilled in the art.

A timing control unit (TCU)/event generator 41 (FIG. 2) is also illustratively included at the physical layer for interfacing with the cellular network (i.e., the cellular base station 31) to coordinate communications to within appropriate network timing slots, as will be appreciated by those skilled in the art. It will also be appreciated that the dynamic scheduler 36, micro-scheduler 38, TCU/event generator 41, and/or memories 37, 41 may be implemented using a combination of hardware and/or software components. Moreover, the memories 37, 40 need not be separate memory devices in all embodiments, but instead could merely be partitions of a same memory device. Other exemplary components which may be included in such a wireless communications device are described further below with reference to FIG. 4.

By way of comparison, in a typical prior art implementation a processing module (e.g., a digital signal processor (DSP) or other processor) creates physical control schedules during run time for the network communication operations as they come due. Such scheduling operations may conceptually be considered as dynamic scheduling, as new schedules are continuously being created. These schedules are typically either erased from memory or overwritten in memory as they are completed, and new schedules are generated to thereby save on memory consumption.

Such a prior art dynamic schedule control process creates (and re-creates) all of the control schedules during run time, which takes time, power, and resources from the processor. This can be problematic in that, even when the device is in a "sleep" mode with its LCD screen turned off, constantly re-creating schedules for RSSI checks every thirty seconds or so still consumes a significant amount of battery resources due to the processor and bus resources that are used.

Yet, in accordance with the present embodiment, scheduling information or data that is common (i.e., substantially identical or unchanged) from one RSSI measurement to the next is separated from the processing operations of the dynamic scheduler 36, and this common or static information is instead stored in the static schedule memory 37. As such, the dynamic scheduler 36 therefore typically only needs to update the recurring start times for the next (i.e., upcoming) RSSI measurement operations.

This hybrid approach between static and dynamic scheduling control may be used to advantageously reduce the amount of processing time, and therefor power consumption, used for generating and implementing RSSI and other control schedules, as will be appreciated by those skilled in the art. Considered alternatively, the RSSI scheduling operations are implemented using static control such that the building blocks of the schedules are static, and the required blocks are called from the static schedule memory 37 at run time.

Figure 3:
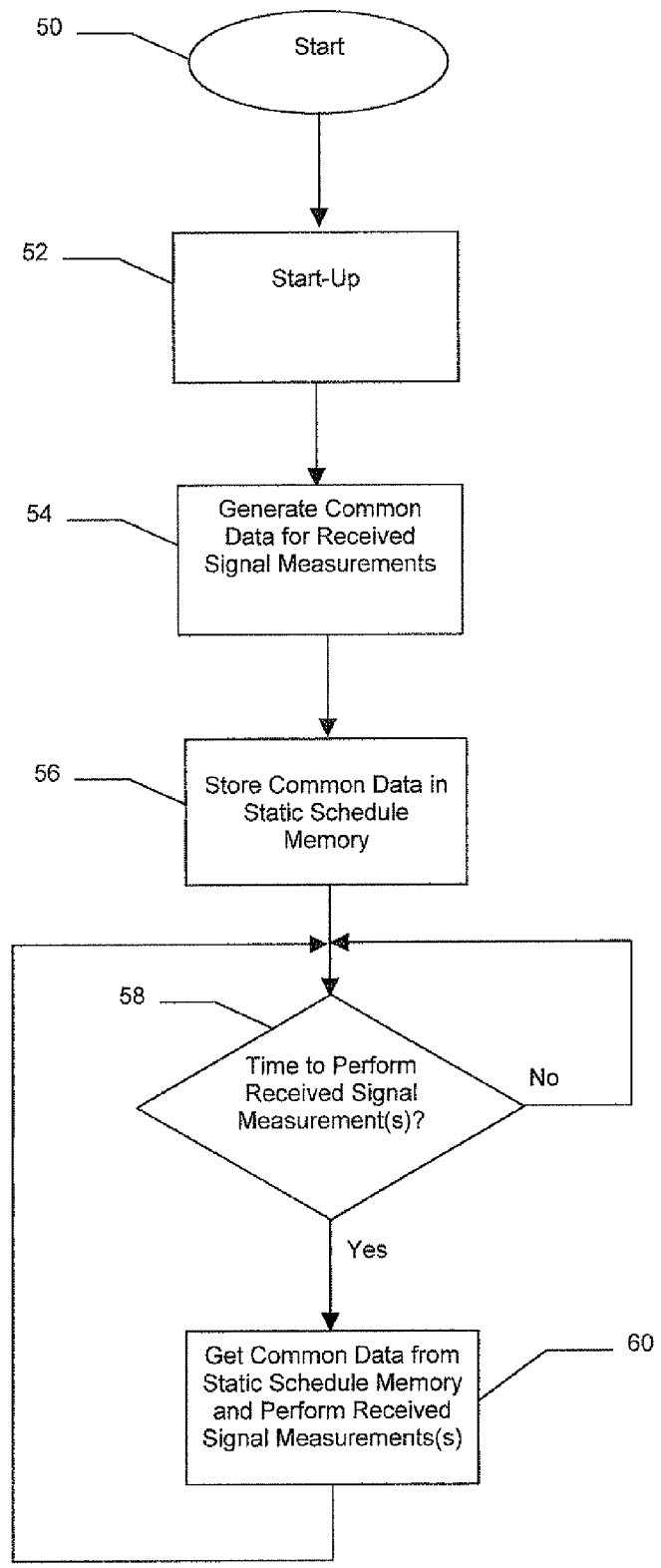
FIG. 3 is a flow diagram of a hybrid dynamic/static receive signal measurement scheduling method in accordance with one embodiment.

Referring now additionally to FIG. 3, one exemplary implementation of a hybrid dynamic/static scheduling method is now described. Beginning at Block 50, upon start-up (Block 52) the dynamic scheduler 36 may initially generate the common data associated with the RSSI control schedules, at Block 54, which is stored in the static schedule memory (e.g., in a look-up table (LUT)) for future reference (Block 56). Rather than re-generating this common schedule information every thirty seconds or so, the micro-scheduler 38 simply refers to the look-up table every RSSI detection period as needed, at Block 38.

With the common schedule data for RSSI measurements already in the static schedule memory 37, all that remains is to send the schedule to the TCU/event generator 41 based upon the RSSI measurement start times scheduled by the dynamic scheduler 36 (Block 60). The TCU/event controller 41 cooperates with the micro-scheduler 38 to process the schedules at the correct time, and activate only the components of the mobile cellular device 34 that are required (e.g., the receiver 33, transmitter, etc.). This advantageously saves schedule building time (power) as well as processor run time (resources/power). Direct Memory Access (DMA) or other suitable methods may be used to send the common schedule data that is already in the static schedule memory 37 to the TCU/event generator 41, for example, although other suitable approaches may also be used.

While the individual power savings for a given RSSI schedule processing operation may be relatively small, over time the cumulative effects of such repetitive processing operations can result in a significant power drain, particularly when the mobile cellular device 30 is in sleep mode (less power savings may be achieved in "wake" or normal mode where the device is already performing processing operations and/or the RE circuitry is already in use due to a telephone call, etc.). That is, during sleep mode every microsecond counts toward extending battery life. Another advantage of the hybrid static/dynamic control approach is that this may reduce the time that other dynamic scheduling operations have to wait for available processing resources.

Accordingly, the above-described scheduling approach is particularly advantageous for reducing the work (i.e., processing operations) a mobile cellular device needs to do to schedule an event that repeats on a regular bases, such as RSSI measurements. This is achieved by storing in the static schedule memory 37 (e.g., in LUT format) the instruction/timing event for measurement, and loading these instructions into the TCU/event generator 38 as needed. It should be noted that this approach may be used with other operations besides received signal/RSSI measurement scheduling that repeat on a regular or periodic basis, as will be appreciated by those skilled in the art.

The above-described approach advantageously has the benefit of reducing the time the RF front end is turned on, not only in the sleep mode but also in normal operating mode as well. In some embodiments, the physical layer/RF control may run on a DSP. The remaining portions of the processor 35 may be implemented using the DSP and/or microprocessor of the mobile cellular device 30, for example. The above-noted approach is particularly well suited to GSM/GPRS/EDGE implementations (especially in extended dynamic allocation required for class 12 and higher devices), though it may be used in accordance with other cellular protocols (e.g., 3G) as well, as will be appreciated by those skilled in the art.

Exemplary components which may be used in the mobile cellular device 30 are now described with reference to a hand-held mobile wireless communications device 1000 illustrated in FIG. 4. The device 1000 illustratively includes a housing 1200, a keypad 1400 and an output device 1600. The output device shown is a display 1600, which is preferably a full graphic LCD. Other types of output devices may alternatively be utilized. A processing device 1800 is contained within the housing 1200 and is coupled between the keypad 1400 and the display 1600. The processing device 1800 controls the operation of the display 1600, as well as the overall operation of the mobile device 1000, in response to actuation of keys on the keypad 1400 by the user.

The housing 1200 may be elongated vertically, or may take on other sizes and shapes (including clamshell housing structures). The keypad may include a mode selection key, or other hardware or software for switching between text entry and telephony entry.

Figure 4:
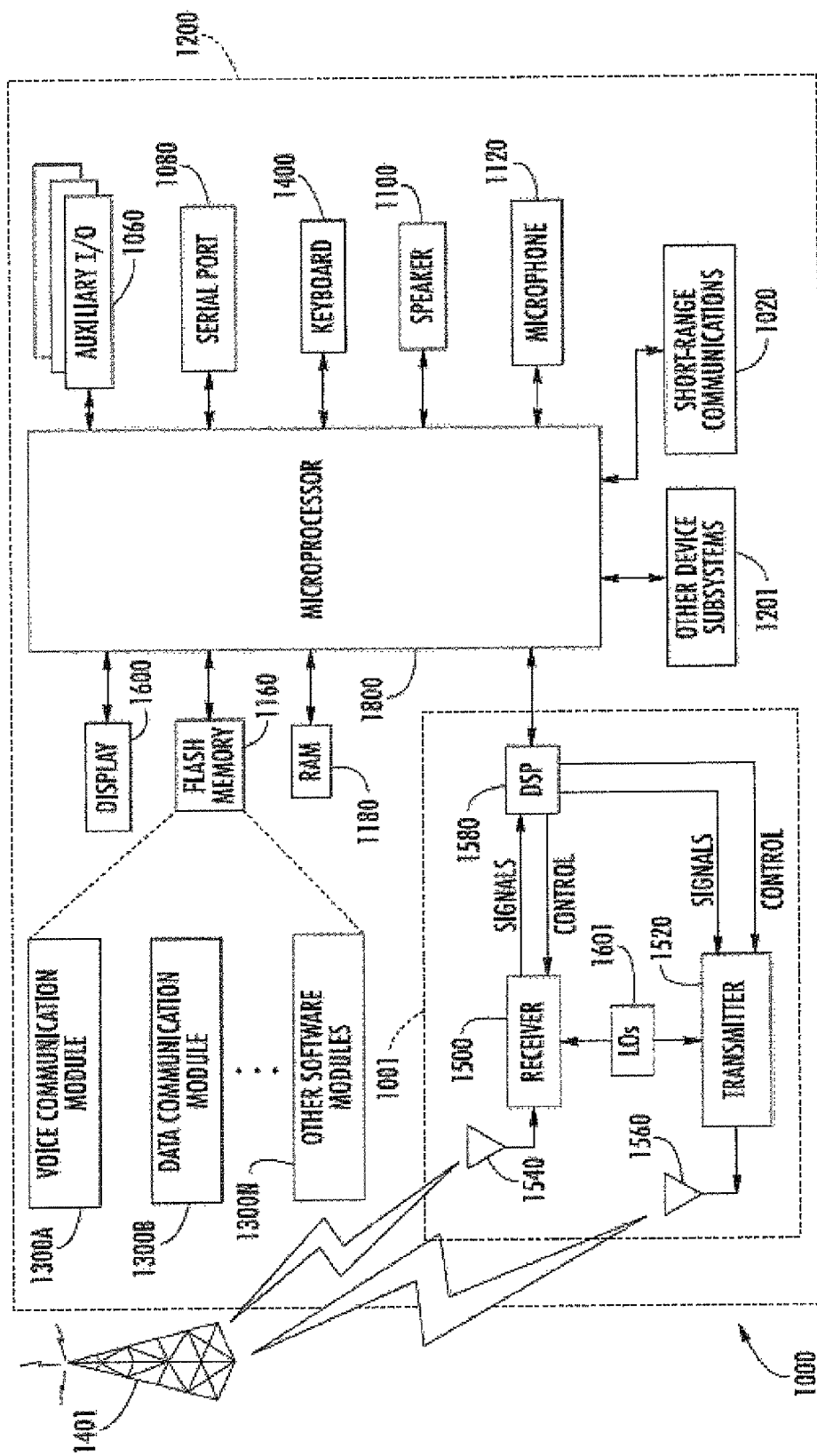
FIG. 4 is a schematic block diagram illustrating exemplary components which may be included in the mobile cellular device of FIG. 1.

In addition to the processing device 1800, other parts of the mobile device 1000 are shown schematically in FIG. 4. These include a communications subsystem 1001; a short-range communications subsystem 1020; the keypad 1400 and the display 1600, along with other input/output devices 1060, 1080, 1100 and 1120; as well as memory devices 1160, 1180 and various other device subsystems 1201. The mobile device 1000 is preferably a two-way RF communications device having voice and data communications capabilities. In addition, the mobile device 1000 preferably has the capability to communicate with other computer systems via the Internet.

Operating system software executed by the processing device 1800 is preferably stored in a persistent store, such as the flash memory 1160, but may be stored in other types of memory devices, such as a read only memory (ROM) or similar storage element. In addition, system software, specific device applications, or parts thereof, may be temporarily loaded into a volatile store, such as the random access memory (RAM) 1180. Communications signals received by the mobile device may also be stored in the RAM 1180.

The processing device 1800, in addition to its operating system functions, enables execution of software applications 1300A-1300N on the device 1000. A predetermined set of applications that control basic device operations, such as data and voice communications 1300A and 1300B, may be installed on the device 1000 during manufacture. In addition, a personal information manager (PIM) application may be installed during manufacture. The PIM is preferably capable of organizing and managing data items, such as e-mail, calendar events, voice mails, appointments, and task items. The PIM application is also preferably capable of sending and receiving data items via a wireless network 1401. Preferably, the PIN data items are seamlessly integrated, synchronized and updated via the wireless network 1401 with the device user's corresponding data items stored or associated with a host computer system.

Communication functions, including data and voice communications, are performed through the communications subsystem 1001, and possibly through the short-range communications subsystem. The communications subsystem 1001 includes a receiver 1500, a transmitter 1520, and one or more antennas 1540 and 1560. In addition, the communications subsystem 1001 also includes a processing module, such as a digital signal processor (DSP) 1580, and local oscillators (LOs) 1601. The specific design and implementation of the communications subsystem 1001 is dependent upon the communications network in which the mobile device 1000 is intended to operate. For example, a mobile device 1000 may include a communications subsystem 1001 designed to operate with the Mobitex™, Data TAC™ or General Packet Radio Service (GPRS) mobile data communications networks, and also designed to operate with any of a variety of voice communications networks, such as AMPS, TDMA, COMA, WCDMA, PCS, GSM, EDGE, etc. Other types of data and voice networks, both separate and integrated, may also be utilized with the mobile device 1000. The mobile device 1000 may also be compliant with other communications standards such as 3GSM, 3GPP, UMTS, etc.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore requires a subscriber identity module, commonly referred to as a SIM card, in order to operate on a GPRS network.

When required network registration or activation procedures have been completed, the mobile device 1000 may send and receive communications signals over the communication network 1401. Signals received from the communications network 1401 by the antenna 1540 are routed to the receiver 1500, which provides for signal amplification, frequency down conversion, filtering, channel selection, etc., and may also provide analog to digital conversion. Analog-to-digital conversion of the received signal allows the DSP 1580 to perform more complex communications functions, such as demodulation and decoding. In a similar manner, signals to be transmitted to the network 1401 are processed (e.g. modulated and encoded) by the DSP 1580 and are then provided to the transmitter 1520 for digital to analog conversion, frequency up conversion, filtering, amplification and transmission to the communication network 1401 (or networks) via the antenna 1560.

In addition to processing communications signals, the DSP 1580 provides for control of the receiver 1500 and the transmitter 1520. For example, gains applied to communications signals in the receiver 1500 and transmitter 1520 may be adaptively controlled through automatic gain control algorithms implemented in the DSP 1580.

In a data communications mode, a received signal, such as a text message or web page download, is processed by the communications subsystem 1001 and is input to the processing device 1800. The received signal is then further processed by the processing device 1800 for an output to the display 1600, or alternatively to some other auxiliary I/O device 1060. A device user may also compose data items, such as e-mail messages, using the keypad 1400 and/or some other auxiliary I/O device 1060, such as a touchpad, a rocker switch, a thumb-wheel, or some other type of input device. The composed data items may then be transmitted over the communications network 1401 via the communications subsystem 1001.

In a voice communications mode, overall operation of the device is substantially similar to the data communications mode, except that received signals are output to a speaker 1100, and signals for transmission are generated by a microphone 1120. Alternative voice or audio I/O subsystems, such as a voice message recording subsystem, may also be implemented on the device 1000. In addition, the display 1600 may also be utilized in voice communications mode, for example to display the identity of a calling party, the duration of a voice call, or other voice call related information.

The short-range communications subsystem enables communication between the mobile device 1000 and other proximate systems or devices, which need not necessarily be similar devices. For example, the short-range communications subsystem may include an infrared device and associated circuits and components, or a Bluetooth™ communications module to provide for communication with similarly-enabled systems and devices.

Many modifications and other embodiments will come to the mind of one skilled in the art having the benefit of the teachings presented in the foregoing descriptions and the associated drawings. Therefore, it is understood that various modifications and embodiments are intended to be included within the scope of the appended claims.

That which is claimed is:

1. A cellular communications system comprising:
   a cellular base station; and
   at least one mobile cellular device communicating with said cellular base station and comprising
      a receiver, and
      a processor cooperating with said receiver for implementing a hybrid dynamic and static received signal measurement scheduling control and comprising
         a dynamic scheduler for scheduling recurring received signal measurement times,
         a static schedule memory for storing common scheduling data for received signal measurements that is unchanged between the received signal measurements, and
         a micro-scheduler for scheduling received signal measurements based upon the recurring received signal measurement times and the common scheduling data for received signal measurements.

2. The cellular communications system of claim 1 wherein the received signal measurements comprise Received Signal Strength Indicator (RSSI) measurements.

3. The cellular communications system of claim 1 wherein said processor operates in accordance with a hierarchical protocol layer architecture; and wherein said dynamic scheduler operates at a higher protocol layer than said micro-scheduler.

4. The cellular communications system of claim 3 wherein said micro-scheduler operates at a data link layer.

5. The cellular communications system of claim 1 wherein said at least one mobile cellular device further comprises a transmitter; and wherein said processor further comprises an event generator cooperating with said transmitter, receiver and micro-scheduler to perform the received signal measurements.

6. The cellular communications system of claim 5 wherein said processor operates in accordance with a hierarchical protocol layer architecture including a physical layer; and wherein said event generator operates at the physical layer.

7. The cellular communications system of claim 5 wherein said micro-scheduler provides the common data to said event generator using Direct Memory Access (DMA).

8. The cellular communications system of claim 1 wherein said at least one mobile cellular communication device further comprises at least one antenna coupled to said receiver.

9. A mobile cellular device for communicating with a cellular base station and comprising:
   a receiver; and
   a processor cooperating with said receiver for implementing a hybrid dynamic and static received signal measurement scheduling control and comprising
      a dynamic scheduler for scheduling recurring received signal measurement times,
      a static schedule memory for storing common scheduling data for received signal measurements that is unchanged between the received signal measurements, and
      a micro-scheduler for scheduling received signal measurements based upon the recurring received signal measurement times and the common scheduling data for received signal measurements.

10. The mobile cellular device of claim 9 wherein the received signal measurements comprise Received Signal Strength Indicator (RSSI) measurements.

11. The mobile cellular device of claim 9 wherein said processor operates in accordance with a hierarchical protocol layer architecture; and wherein said dynamic scheduler operates at a higher protocol layer than said micro-scheduler.

12. The mobile cellular device of claim 11 wherein said micro-scheduler operates at a data link layer.

13. The mobile cellular device of claim 9 further comprising a transmitter; and wherein said processor further comprises an event generator cooperating with said transmitter, receiver and micro-scheduler to perform the received signal measurements.

14. The mobile cellular device of claim 13 wherein said processor operates in accordance with a hierarchical protocol layer architecture including a physical layer; and wherein said event generator operates at the physical layer.

15. A mobile cellular device for communicating with a cellular base station and comprising:
    a receiver; and
    a processor cooperating with said receiver and operating in accordance with a hierarchical protocol layer architecture, said processor comprising,
       a dynamic scheduler for scheduling recurring received signal measurement times,
       a static schedule memory for storing common scheduling data for received signal measurements that is unchanged between the received signal measurements, and
       a micro-scheduler for scheduling received signal measurements based upon the recurring received signal measurement times and the common scheduling data for received signal measurements,
       said dynamic scheduler operating at a higher protocol layer than said micro-scheduler.

16. The mobile cellular device of claim 15 wherein the received signal measurements comprise Received Signal Strength Indicator (RSSI) measurements.

17. The mobile cellular device of claim 15 wherein said micro-scheduler operates at a data link layer.

18. The mobile cellular device of claim 15 further comprising a transmitter; and wherein said processor further comprises an event generator cooperating with said transmitter, receiver and micro-scheduler to perform the received signal measurements.

19. The mobile cellular device of claim 15 wherein said event generator operates at a physical layer.

20. A hybrid dynamic and static received signal measurement scheduling control method for a mobile cellular device comprising:
    dynamically scheduling recurring received signal measurement times;

storing common scheduling data for received signal measurements in a static schedule memory, the common scheduling data remaining unchanged between the received signal measurements; and scheduling received signal measurements based upon the recurring received signal measurement times and the common scheduling data for received signal measurements.

21. The method of claim 20 wherein the received signal measurements comprise Received Signal Strength Indicator (RSSI) measurements.

22. The method of claim 20 wherein the dynamic scheduling is performed at a higher protocol layer of a hierarchical protocol layer architecture than the received signal measurement scheduling.

23. The method of claim 22 wherein the received signal measurement scheduling is performed at a data link layer.

24. The method of claim 22 further comprising performing the received signal measurements at a physical layer.

* * * * *